United States Patent [19]
Coad et al.

[11] Patent Number: 5,379,984
[45] Date of Patent: Jan. 10, 1995

[54] GATE VALVE FOR VACUUM PROCESSING SYSTEM

[75] Inventors: George L. Coad, Lafayette; George Matthias, Freemont, both of Calif.

[73] Assignee: Intevac, Inc., Santa Clara, Calif.

[21] Appl. No.: 180,205

[22] Filed: Jan. 11, 1994

[51] Int. Cl.6 .................................................. F16K 1/18
[52] U.S. Cl. ...................................... 251/298; 251/357
[58] Field of Search .......................... 251/298, 357, 358

[56] References Cited

U.S. PATENT DOCUMENTS

| | | | |
|---|---|---|---|
| 4,196,886 | 4/1980 | Murray | 251/368 X |
| 4,351,361 | 9/1982 | Worley | 251/298 X |
| 5,205,532 | 4/1993 | Naehring | 251/298 X |

*Primary Examiner*—John C. Fox
*Attorney, Agent, or Firm*—William R. McClellan; Stanley Z. Cole

[57] ABSTRACT

A vacuum gate valve includes a valve body having an opening therethrough and a valve seat surrounding the opening, and a swing gate assembly rotatable about a pivot axis between an open position and a closed position. The swing gate assembly includes a swing gate body, a resilient seal gasket mounted to the swing gate body so as to sealingly engage the valve seat in the closed position, and a spreader for flattening the resilient seal gasket in a region that engages the valve seat. The gate valve further includes an actuator for rotating the swing gate assembly between the open position and the closed position. In a preferred embodiment, the seal gasket is a resilient tube, and the spreader is located within the tube. The swing gate assembly may include a mechanism for adjusting the spreader to thereby adjust the tension applied to the seal gasket.

18 Claims, 4 Drawing Sheets

GATE VALVE FOR VACUUM PROCESSING SYSTEM

FIELD OF THE INVENTION

This invention relates to gate valves for vacuum processing systems and, more particularly, to a vacuum gate valve which is simple in construction and which operates at high speed with a low activation force.

BACKGROUND OF THE INVENTION

The fabrication of flat panel displays involves the deposition of various films, including indium tin oxide (ITO) and metals, on large glass panels. The glass panels, which are typically rectangular, may have dimensions up to 450 mm by 550 mm or greater. ITO and metals can be deposited on the glass panels by sputtering from a target of the material to be deposited. In some cases, such as ITO, the target material may react with a gas, such as oxygen, in the sputtering chamber. Sputtering typically involves heating of the substrate and deposition of the desired film on the heated substrate. The substrate may be preheated in a separate chamber prior to sputtering.

Production systems for sputter deposition of films on glass panels should have automated substrate handling, a high throughput rate, minimum particulate contamination, small floor space requirements and high reliability.

One existing system for sputter deposition on flat panel displays is the so-called "inline" system, wherein substrates are moved along a linear or U-shaped path through various processing chambers. One disadvantage of such systems is that they require a large amount of floor space in the fabrication facility. In addition, such systems have limited flexibility in that only serial processes can be allowed; no parallel processing can be done.

Another existing system for sputter deposition of flat panel displays is the so-called "cluster tool". In the cluster tool, multiple processing chambers are positioned around a central chamber. The substrates are transferred from the central chamber into selected processing chambers. Existing systems have utilized a configuration where the substrate has a horizontal orientation and thus is subject to increased particulate contamination. Existing systems have also had a limited throughput rate.

All known systems for fabrication of flat panel displays have had one or more disadvantages, including yield loss due to particulate contamination, low throughput rates, high downtime due to frequent cleaning and target changes, inability to handle large panels, poor process monitoring, large floor space requirements and large clean room requirements. A critical element in such systems is the vacuum gate valve which isolates different vacuum chambers when it is closed and which permits substrates to be transported between chambers when it is open. The vacuum gate valve, in addition to providing a tight seal when closed, should operate in a short time, should be simple in construction and low in cost and should have a long operating life.

SUMMARY OF THE INVENTION

According to the present invention, a vacuum gate valve comprises a valve body having an opening therethrough and a valve seat surrounding the opening, and a swing gate assembly rotatable about a pivot axis between an open position wherein the opening through the valve body is unobstructed and a closed position wherein the opening is sealed. The swing gate assembly comprises a swing gate body and a seal gasket. The seal gasket comprises a resilient sheet mounted to the swing gate body so as to sealingly engage the valve seat in the closed position. The seal gasket is urged into engagement with the valve seat in the closed position by a differential pressure on opposite sides of the valve body. The vacuum gate valve further includes means for rotating the swing gate assembly about the pivot axis between the open position and the closed position.

The swing gate assembly preferably includes a spreader for applying tension to the seal gasket so that it is flattened in a region that engages the valve seat. In a preferred embodiment, the seal gasket comprises a resilient tube, and the spreader is located within the tube. The spreader preferably comprises a channel having opposed sides that apply tension to the resilient tube in the region that engages the valve seat. Preferably, the swing gate assembly further includes means for adjusting the spreader to thereby adjust the tension applied to the seal gasket.

Preferably, the swing gate assembly is rotatably coupled to the valve body at opposite ends. The means for rotating the swing gate assembly comprises a rotary actuator coupled to the swing gate assembly at one end. The rotary actuator is located externally of the vacuum envelope and is coupled to the swing gate assembly through a rotary vacuum seal. Because the seal gasket is urged into contact with the valve seat by atmospheric pressure, a relatively small actuating force can be utilized, while maintaining a sufficient sealing force.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
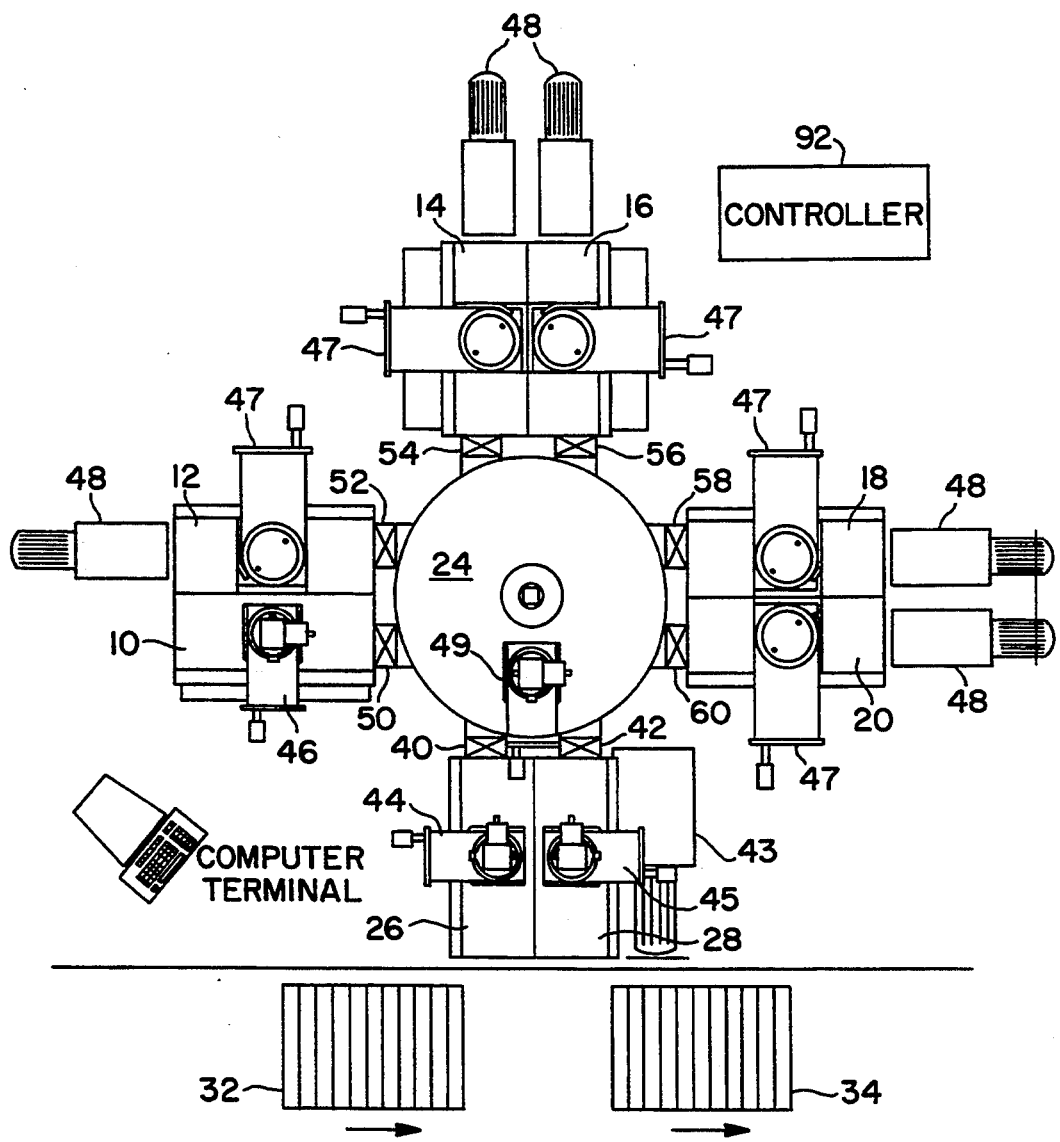
FIG. 1 is a layout diagram of a vacuum processing system.
Figure 2:
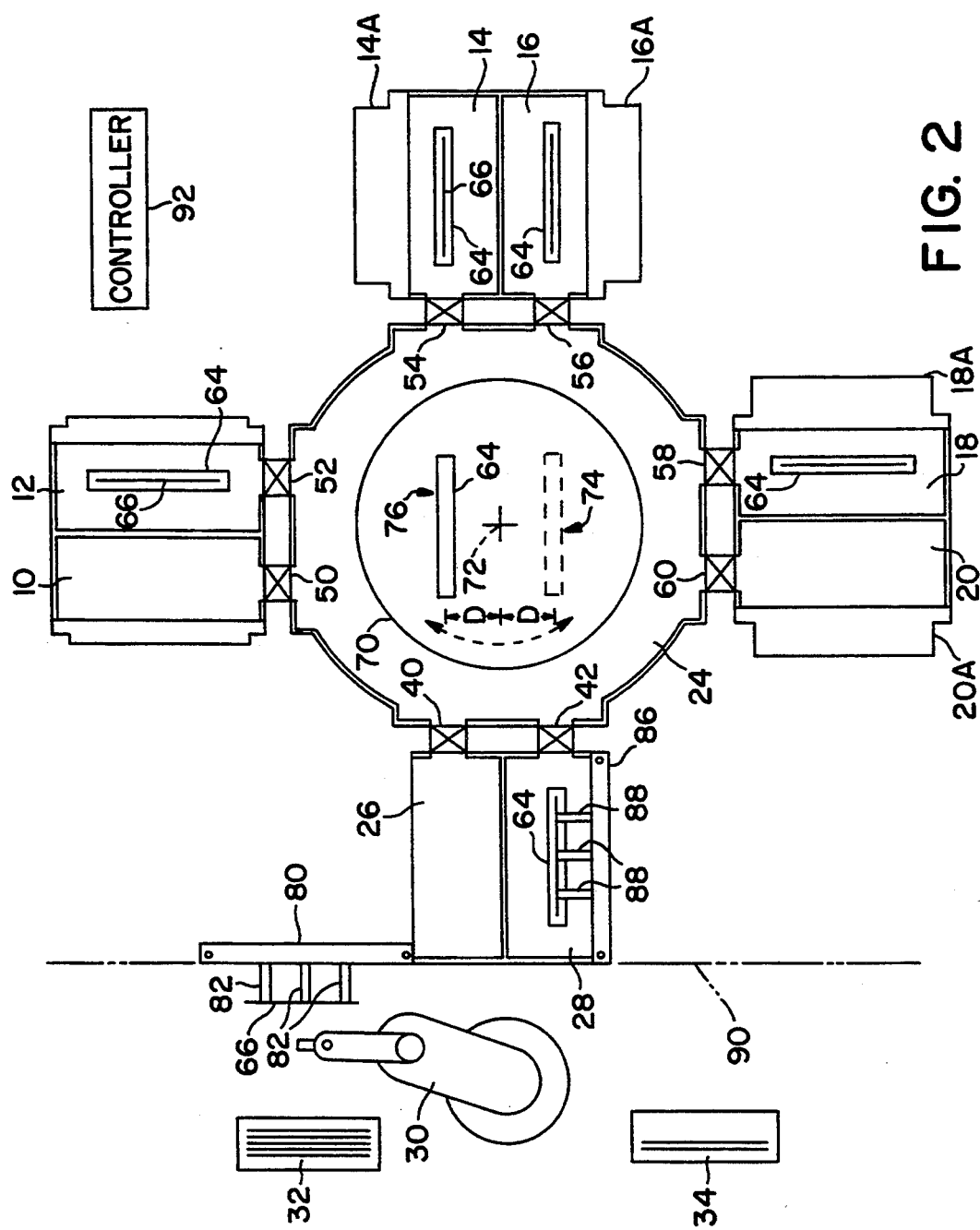
FIG. 2 is a schematic, cross-sectional top view of the system of FIG. 1, showing substrate handling and processing.

A layout diagram of a vacuum processing system is shown in FIG. 1. A schematic, cross-sectional view of the system is shown in FIG. 2. Cabinets for a system controller, power distribution and control equipment, control equipment for vacuum pumps, and the like, which form part of the system, are omitted from FIGS. 1 and 2 for ease of understanding. The system is designed for handling and processing rectangular glass panels for flat panel displays. More particularly, the system is designed for sputter deposition of films on such glass panels. The system is designed primarily for sputter deposition of indium tin oxide (ITO) films and metal films, but is not limited to such films.

The vacuum processing system of the present invention utilizes a cluster configuration, wherein various processing stations are clustered around a central buffer chamber. As shown in FIGS. 1 and 2, processing stations 10, 12, 14, 16, 18 and 20 are positioned around a central buffer chamber 24. The processing chambers typically include heating chambers and sputter deposition chambers, and may include additional functions such as RF etch or RF bias. Substrates are loaded into the system through a load lock 26 and are removed from the system through an unload lock 28. Both the load lock 26 and the unload lock 28 are coupled to the buffer chamber 24. Substrates are loaded by a robot 30 from a load cassette 32 into the load lock 26. The substrates are unloaded by robot 30 from the unload lock 28 to an unload cassette 34.

The substrates are maintained in a vertical orientation at all times during handling and processing in the system. As a result, particulate contamination is minimized. The substrates are handled and processed by the system in a time multiplexed manner so that multiple substrates can be processed concurrently. A throughput rate of over 60 substrates per hour can be achieved with ITO film thickness of 2500 angstroms.

The load lock 26 and the unload lock 28 communicate with the central buffer chamber 24 through gate valves 40 and 42 respectively. Similarly, processing chambers 10, 12, 14, 16, 18 and 20 communicate with central buffer chamber 24 through gate valves 50, 52, 54, 56, 58 and 60, respectively. The load lock 26, the unload lock 28, each of the processing chambers and the central buffer chamber 24 are evacuated by separate vacuum pumping systems. In the example of FIG. 1, the load lock 26 and the unload lock 28 are vacuum pumped by a roughing pump 43 and cryopumps 44 and 45. Processing chamber 10 is evacuated by cryopump 46. Each of processing chambers 12, 14, 16, 18 and 20 is evacuated by a turbopump 47 and a foreline pump 48. The buffer chamber 24 is evacuated by a cryopump 49. It will be understood that different vacuum pumping configurations can be used. For example, a turbopump or a cryopump can be used for vacuum pumping each of the processing chambers, depending on the requirements of a particular application. At any time during operation, only one of the gate valves is open, thus insuring isolation between the processing chambers and the load and unload locks.

Substrates are transported through the system on substrate carriers 64. Each substrate carrier 64 supports a substrate 66 in a vertical orientation. The substrate carrier 64 is preferably a metal plate that is maintained in vertical orientation during operation of the system. The plate has upper edges that meet in a right angle and have a V-shaped grooves for receiving a substrate. The substrate is held by its edges in a vertical orientation. Substrate carriers 64 holding substrates 66 are transported through the system by carrier transport assemblies between the different chambers and a turntable 70 mounted within buffer chamber 24 for rotation about a vertical axis 72. The turntable 70 includes substrate carrier positions 74 and 76 for retaining substrate carriers 64 during rotation of turntable 70. In FIG. 2, an empty substrate carrier 64 is present in position 76, and position 74 is empty. The substrate carrier positions 74 and 76 on turntable 70 are spaced from vertical axis 72 by equal distances D. The distance D is selected to insure alignment of the substrate carrier positions 74 and 76 with substrate processing positions in processing chambers 10, 12, 14, 16, 18 and 20 and with load and unload positions in load lock 26 and unload lock 28, respectively. This configuration permits the substrate carriers 64 to be transported along a straight line between substrate carrier position 76 and load lock 26 and between position 76 and processing chamber 14. Similarly, a substrate carrier 64 can be transported along a straight line between position 74 and turntable 70 and unload lock 28 and between position 74 and processing chamber 16. Rotation of the turntable 70 by 180° causes positions 74 and 76 to be interchanged. Rotation of turntable 70 by 90° in a clockwise direction from the orientation shown in FIG. 2 causes substrate carrier position 76 to be aligned with processing chambers 12 and 18, so that a substrate carrier 64 in position 76 can be transported to or from either of these processing chambers. Similarly, position 74 is aligned with processing chambers 10 and 20, and a substrate carrier 64 in position 74 can be transported to or from either of these processing chambers. Rotation of turntable 70 by 90° in a counterclockwise direction from the orientation shown in FIG. 2 causes positions 74 and 76 to be interchanged.

The turntable arrangement shown in FIG. 2 permits a substrate and substrate carrier to be transported from load lock 26 into one of the substrate carrier positions 74, 76 on turntable 70 and from there into any selected processing chamber. After processing in the selected processing chamber, the substrate and substrate carrier can be transported into a second processing chamber or into the unload lock 28. Thus, the system has complete flexibility and, as described below, can process several substrates concurrently for high throughput.

The load lock 26 includes a door 80 having holders 82 for substrate 66. Similarly, the unload lock 28 includes a door 86 having holders 88 for a substrate. The door 80 of load lock 26 is shown in FIG. 2 in an open position, and the door 86 of unload lock 28 is shown in a closed position. In one example described below, the load lock 26 and the unload lock 28 include double pivoting mechanisms for moving the doors 80 and 86 between the open position, where the substrate 66 is accessed through a clean room wall 90, and the closed position, where the substrate is sealed within the respective lock. It will be understood that other door arrangements can be utilized.

A controller 92 controls the gate valves, the carrier transport assemblies, the load and unload locks, the processing chambers, the turntable and all other components of the system in accordance with the operation described herein. The controller 92 preferably includes a computer for storing operational sequences, process information and the like, and for controlling the above elements.

A typical sequence for handling and processing of a substrate is now described. The substrate 66 is transferred by robot 30 from load cassette 32 to holders 82 on the door 80 of load lock 26. Then the door 80 is pivoted to the closed and sealed position, and the load lock 26 is evacuated to a desired pressure level. When the desired pressure level is reached, the gate valve 40 is opened and a substrate carrier 64 is transported from position 76 on turntable 70 into load lock 26. The substrate 66 is transferred from holders 82 onto carrier 64, and the carrier 64 is transported through gate valve 40 to turntable 70. Then, the gate valve 40 is closed, and the turntable 70 is rotated so that the substrate and substrate carrier 64 in position 76 are aligned with a selected processing chamber, for example, processing chamber 12. Then, the gate valve 52 is opened, and the substrate and the substrate carrier 64 are transported from turntable 70 into processing chamber 12. The gate valve 52 is closed, and the substrate is processed in processing chamber 12. The process in chamber 12 may involve preheating of the substrate. Since the gate valve 52 is closed, other substrates and substrate carriers can be moved while the substrate is being processed in processing chamber 12. When the process in chamber 12 is complete, the gate valve 52 is opened and the substrate and substrate carrier 64 are transported onto turntable 70. The turntable 70 is typically rotated into alignment with a second selected processing chamber, for example, processing chamber 14. The gate valve 54 is opened, and the substrate and substrate carrier 64 are transported from turntable 70 into processing chamber 14. The gate valve 54 is closed, and the substrate is processed in chamber 14. The process in chamber 14 may involve sputter deposition of an ITO film or a metal film. When the process in chamber 14 is complete, gate valve 54 is opened and the substrate and substrate carrier 64 are transported onto turntable 70. The gate valve 54 is closed, and the turntable 70 is rotated into alignment with unload lock 28. The gate valve 42 is opened, and the substrate and the substrate carrier 64 are transported into the unload lock 28. The substrate is transferred from substrate carrier 64 to holders 88, and the substrate carrier 64 is transported back to turntable 70. Then, gate valve 42 is closed, and the unload lock 28 is vented to atmosphere. Finally, the door 86 is opened to a position equivalent to that shown for door 80, and the robot 30 transfers the substrate from holders 88 to unload cassette 34.

The handling and processing of a single substrate is described above. In the embodiment of FIGS. 1 and 2, the system includes six processing chambers and six substrate carriers. The turntable 70 has two substrate carrier positions 74 and 76. In one specific example, processing chambers 10 and 12 are used for preheating of substrates, and chambers 14, 16, 18 and 20 are used for sputter coating of substrates. Furthermore, the processing chambers 10, 12, 14, 16, 18 and 20, the load lock 26 and the unload lock 28 are isolated from the buffer chamber 24 by gate valves. This configuration permits multiple substrates to be handled and processed concurrently in a time multiplexed manner, thus achieving a high throughput rate. For example, gate valve 54 is closed during the time that a substrate is being processed in processing chamber 14. During this time, additional substrates can be transferred from the load lock to another of the processing chambers, substrates can be transferred from one processing chamber to another processing chamber, and substrates can be transferred from a processing chamber to the unload lock.

Figure 3:
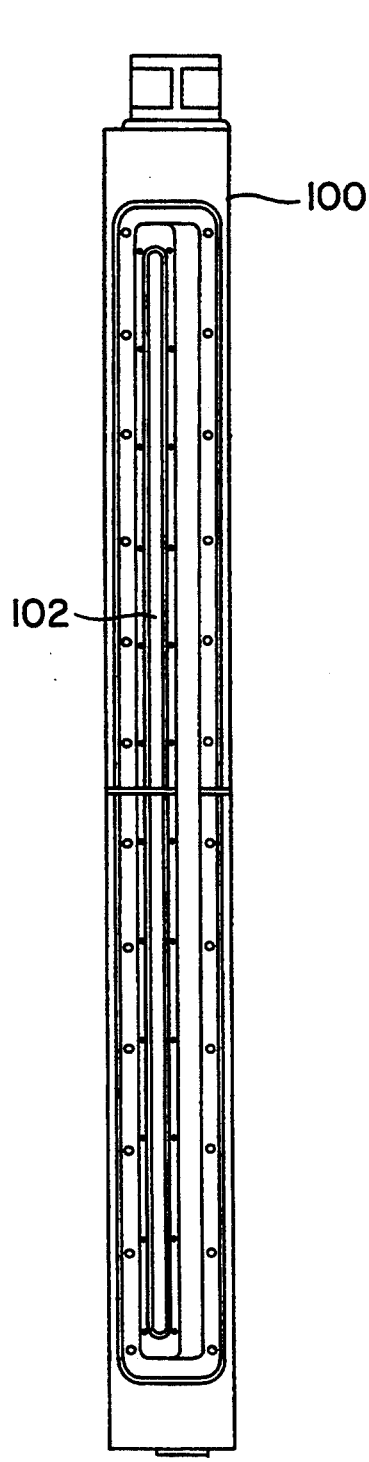
FIG. 3 is a front elevation view of a vacuum gate valve in accordance with the invention.
Figure 4:
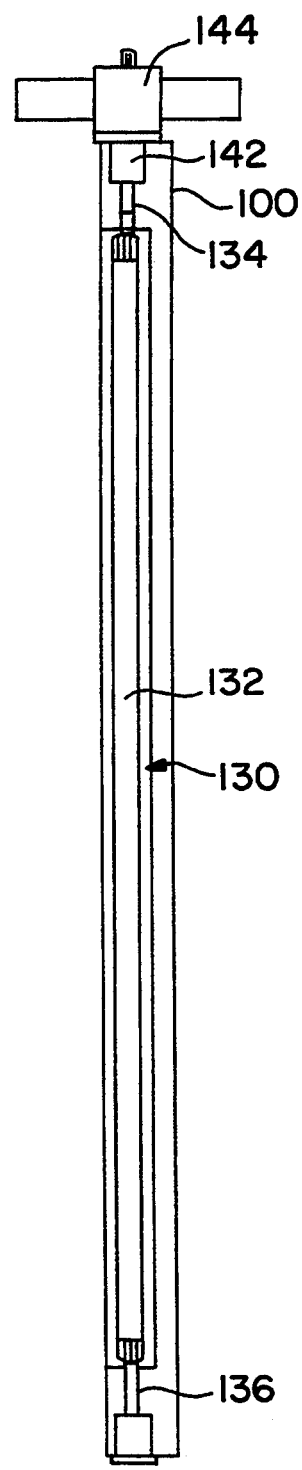
FIG. 4 is a cross-sectional side view of the vacuum gate valve.
Figure 5:
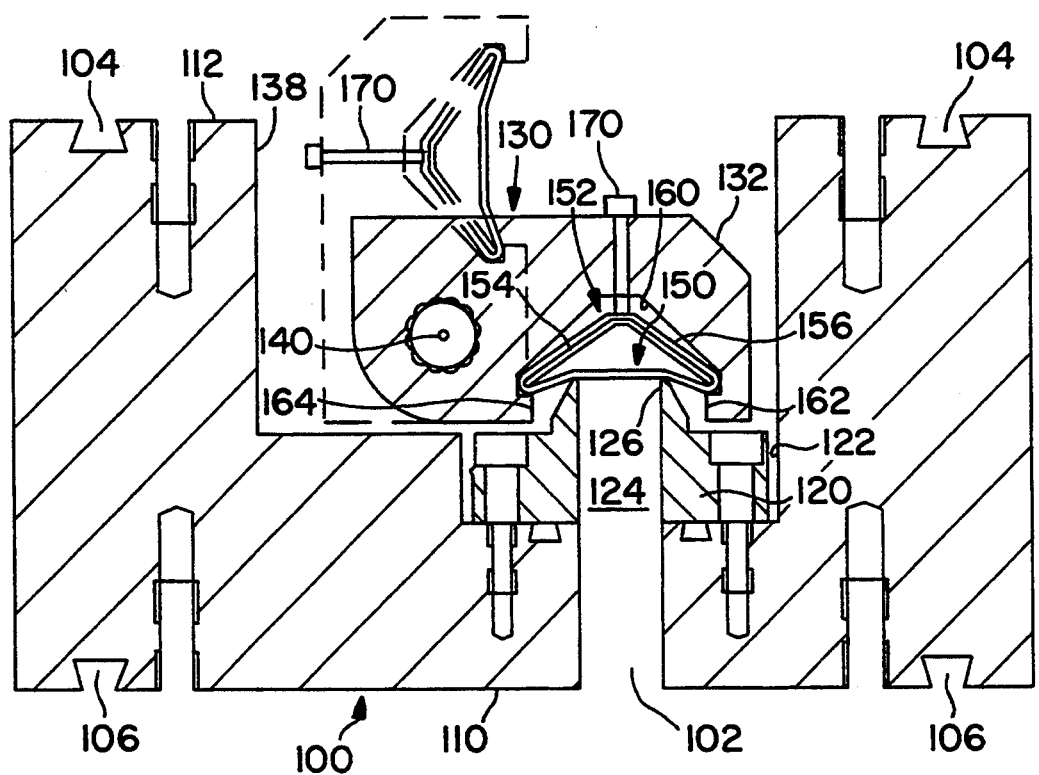
FIG. 5 is a lateral cross-sectional view of the vacuum gate valve and is enlarged in comparison with FIGS. 3 and 4.

A vacuum gate valve in accordance with the present invention is shown in FIGS. 3-5. An opening through the gate valve is dimensioned to permit passage of a desired object. In the vacuum processing system described above, the gate valves must pass the substrate carrier when it is carrying a substrate. The substrate carrier 64 and the substrate have a long, narrow profile when they are transported in a direction parallel to the plane of the substrate carrier. The gate valves should operate rapidly, preferably in about 0.5 to 0.7 seconds, in order for the system to achieve a high throughput rate. In addition, the gate valves should have high reliability, since failure of a gate valve is likely to result in system downtime. The gate valves should also be simple in construction and low in cost.

Referring now to FIGS. 3-5, the vacuum gate valve includes a valve body 100. An opening 102 extends through the valve body 100. In the present example, the opening 102 is an elongated, narrow slit. In one example of the vacuum gate valve, the opening 102 has a length of about 36 inches and a width of about ½ inch. The gate valve construction shown and described herein is most practical when the opening 102 is an elongated slit having a length to width ratio of 10 or greater. The valve body 100 is fabricated of a metal, such as an aluminum alloy, and includes grooves 104 and 106 for elastomer sealing rings, which permit the gate valve to be installed in a vacuum-tight manner. The valve body 100 is installed with a low pressure, or vacuum, side 110 facing the vacuum chamber and a high pressure, or atmospheric, side 112 facing a higher pressure chamber or atmospheric pressure.

A valve seat 120 is affixed to the valve body 100. The valve seat 120 is located in an elongated channel 122 in valve body 100. An opening 124 through valve seat 120 is aligned with opening 102 through valve body 100. The valve seat 120 includes a ridge 126 that completely surrounds the opening 124. As described below, a seal gasket bears against the ridge 126 and forms a seal when the gate valve is closed. In the embodiment of FIG. 5, the valve seat 120 is removably mounted to valve body 100. This permits the valve seat to be replaced, without removing the gate valve from the system. Alternatively, the valve seat 120 can be fabricated as an integral part of the valve body 100.

The gate valve further includes a swing gate assembly 130 that is movable between a closed position shown in solid lines in FIG. 5, and an open position shown in phantom in FIG. 5. The swing gate assembly 130 is mounted in an elongated channel 138 in valve body 100. The swing gate assembly 130 includes a swing gate body 132 that is rotatably attached to valve body 100 at its upper and lower ends by pivot pins 134 and 136, respectively. The swing gate assembly 130 is rotatable about a pivot axis 140 between the open and closed positions. The pivot pin 134 is connected through a rotary vacuum feedthrough 142 to an actuator 144. The actuator 144 is required to rotate the swing gate assembly 130 through about 90° between the open and closed positions. As described below, an actuator with relatively low force can be utilized. In a preferred embodiment, the actuator 144 comprises a rotary action type R11A manufactured by PHD Inc. However, any actuator having the required force and speed can be utilized. The actuator 144 opens and closes the gate valve in response to a control signal from the controller 92.

The swing gate assembly 130 further includes a seal gasket 150 in the form of a resilient sheet that bears against ridge 126 of valve seat 120 and forms a seal when the gate valve is closed. A spreader 152 applies tension to the seal gasket 150 and flattens it, at least in the region where the seal gasket 150 contacts the ridge 126 of valve seat 120. Preferably, the spreader 152 can be adjusted to vary the tension that is applied to the seal gasket 150.

In a preferred embodiment illustrated in FIG. 5, the seal gasket 150 is in the form of an elongated tube and the spreader 152 is positioned within the tubular seal gasket 150. Both the tubular seal gasket 150 and the spreader 152 extend the entire length of opening 102.

The tubular seal gasket configuration avoids any difficulties in securing the seal gasket to the sides of the spreader. The spreader 152 is preferably a channel having an approximately U-shaped or V-shaped cross section. The channel has outwardly-flared, opposed sides 154 and 156. The channel is preferably fabricated of sheet metal to provide rigidity and yet be deformable upon application of sufficient force. The spreader 152 and the tubular seal gasket 150 are located in an elongated channel 160 in swing gate body 132 and are retained in channel 160 by inwardly extending lips 162 and 164 at the open side of channel 160.

Preferably, the tension applied to seal gasket 150 is adjustable. In the embodiment of FIG. 5, the tension is adjusted by deforming the spreader 152. The spreader 152 is deformed by adjustment screws 170. Adjustment screws 170 are threaded through the swing gate body 132 and contact the back of spreader 152. By advancing the adjustment screws 170 toward the valve seat 120, the sides 154 and 156 of the spreader 152 are flared outwardly to a greater degree, thereby increasing the tension applied to the seal gasket 150. Conversely, the applied tension is decreased by retracting the adjustment screws 170 in a direction away from valve seat 120. The seal gasket 150 must be tensioned sufficiently to ensure that it is flat and is securely in contact with the ridge 126 of valve seat 120 around the entire periphery of opening 102 when the gate valve is closed. Preferably, several adjustment screws 170 are spaced along the length of the spreader 152 to ensure that an approximately uniform tension is applied to the seal gasket 150 over its area.

It will be understood that the spreader can have a variety of configurations or that the spreader may be omitted from the gate valve, provided that the seal gasket 150 is mounted to the swing gate body 132 so as to securely contact the valve seat 120 around the periphery of opening 102 when the gate valve is in the closed position. For example, the spreader may be in the form of a channel having a continuously curved cross section. Furthermore, the spreader 152 may be adjusted by any suitable adjustment mechanism.

The material of the seal gasket 150 must have a good quality surface finish, have elasticity and be free of pinholes. In addition, the material should be of relatively low durometer, preferably 75 or lower. In a preferred embodiment, the seal gasket 150 is fabricated of Viton TM, a fluoroelastomer based on the copolymer of vinylidenefluoride and hexafluoropropylene. A preferred thickness is in a range of 0.020 inch to 0.070 inch.

The upper edge of ridge 126 that contacts the seal gasket 150 should be sharp to obtain sufficient seal force, but not so sharp as to cut the seal gasket. Preferably, the upper edge of ridge 126 is fabricated with a radius of about 5 to 10 mils. It will be understood that the valve seat 120 can have any configuration which provides a reliable, vacuum-tight seal to seal gasket 150.

As noted above, the gate valve is mounted with the vacuum side 110 facing the low pressure vacuum chamber. For example, with reference to FIG. 2, the gate valve 40 is mounted with vacuum side 110 facing buffer chamber 24. When the load lock 26 is opened to atmosphere, atmospheric pressure forces seal gasket 150 into a higher pressure contact with ridge 126 of valve seat 120, thus producing a secure vacuum seal. Since atmospheric pressure (or other pressure that is high relative to the vacuum side of the gate valve) assists in maintaining the vacuum seal, a low mechanical force is required for operation of the gate valve and for maintaining the seal in the closed position. This is particularly true where the actuator 144 for the gate valve is located at one end of a long slit. In valves wherein the seal force is not increased by atmospheric pressure, it is difficult to ensure a uniform sealing force along the length of the gate valve, except by using a bulky valve structure and a larger and more expensive actuator. However, in the gate valve of the present invention, a differential pressure between high pressure side 112 and vacuum side 110 of valve body 100 increases the seal pressure and assists in maintaining the vacuum seal. In a situation where the gate valve is used to isolate two vacuum chambers, both having relatively low pressures, such as to isolate the buffer chamber 24 and one of the processing chambers, atmospheric pressure does not assist in maintaining the vacuum seal. However, in this situation, any leak is relatively insignificant unless it has a large area.

The vacuum gate valve shown in FIGS. 3–5 and described above has an actuation time of about 0.5–0.7 seconds. The gate valve seals reliably, with a relatively low mechanical force, and has a long operating life.

While there have been shown and described what are at present considered the preferred embodiments of the present invention, it will be obvious to those skilled in the art that various changes and modifications may be made therein without departing from the scope of the invention as defined by the appended claims.

We claim:

1. A vacuum gate valve comprising:
   a valve body having an opening therethrough and a valve seat surrounding the opening;
   a swing gate assembly rotatable about a pivot axis between an open position wherein said opening is unobstructed and a closed position wherein said opening is sealed, said swing gate assembly comprising a swing gate body and a seal gasket, said seal gasket comprising a resilient sheet mounted to said swing gate body so as to sealingly engage said valve seat in the closed position, said seal gasket being pressed into engagement with said valve seat in the closed position by a differential pressure between opposite sides of said valve body, said swing gate assembly including a spreader for applying tension to said seal gasket and flattening said seal gasket at least in a region that engages said valve seat; and
   means for rotating said swing gate assembly about said pivot axis between said open position and said closed position.

2. A vacuum gate valve as defined in claim 1 wherein said spreader comprises a channel having opposed sides, said seal gasket being affixed to the opposed sides of said channel.

3. A vacuum gate valve as defined in claim 1 wherein said swing gate assembly further includes means for adjusting said spreader to thereby adjust the tension applied to said seal gasket.

4. A vacuum gate valve as defined in claim 1 wherein said seal gasket comprises a resilient tube and wherein said spreader is located within said tube.

5. A vacuum gate valve as defined in claim 4 wherein said spreader comprises a channel having opposed sides that apply tension to said resilient tube, at least in the region that engages said valve seat.

6. A vacuum gate valve as defined in claim 5 wherein said swing gate assembly further includes means for adjusting a spacing between the opposed sides of said channel to thereby adjust the tension applied to said seal gasket.

7. A vacuum gate valve as defined in claim 4 wherein said resilient tube covers said opening when said swing gate assembly is in the closed position.

8. A vacuum gate valve as defined in claim 4 wherein said resilient tube comprises an elastic material that is free of pinholes.

9. A vacuum gate valve as defined in claim 4 wherein said valve seat comprises a ridge surrounding said opening for engaging said seal gasket.

10. A vacuum gate valve as defined in claim 1 wherein said opening comprises an elongated slit having a length to width ratio of 10 or greater.

11. A vacuum gate valve as defined in claim 10 wherein said pivot axis is parallel to a long axis of said elongated slit.

12. A vacuum gate valve comprising:
a valve body having an opening therethrough and a valve seat surrounding the opening;
a swing gate assembly rotatable about a pivot axis between an open position wherein said opening is unobstructed and a closed position wherein said opening is sealed, said swing gate assembly comprising a swing gate body and a seal gasket, said seal gasket comprising a resilient sheet mounted to said swing gate body so as to sealingly engage said valve set in the closed position, said seal gasket being pressed into engagement with said valve seat in the closed position by a differential pressure between opposite sides of said valve body, said swing gate assembly being rotatably coupled to said valve body at opposite ends; and
means for rotating said swing gate assembly about said pivot axis between said open position and said closed position and wherein means for rotating said swing gate assembly comprises a rotary actuator coupled to said swing gate assembly through a rotary vacuum seal.

13. A vacuum gate valve comprising:
a valve body having an opening therethrough and a valve seat surrounding the opening;
a swing gate assembly rotatably mounted to said valve body for rotation about a pivot axis, said swing gate assembly being rotatable about said pivot axis between an open position wherein said opening is unobstructed and a closed position wherein said opening is sealed, said swing gate assembly comprising a swing gate body, a resilient seal gasket mounted to said swing gate body so as to sealingly engage said valve seat in the closed position, and a spreader for flattening said resilient seal gasket in a region that engages said valve seat; and
an actuator for rotating said swing gate assembly between said open position and said closed position in response to a control signal.

14. A vacuum gate valve as defined in claim 13 wherein said swing gate assembly further includes means for adjusting said spreader to thereby adjust tension applied to said resilient seal gasket.

15. A vacuum gate valve as defined in claim 13 wherein said resilient seal gasket comprises a resilient tube and wherein said spreader is located within said tube.

16. A vacuum gate valve as defined in claim 15 wherein said spreader comprises a channel having opposed sides that apply tension to said resilient tube, at least in the region that engages said valve seat.

17. A vacuum gate valve as defined in claim 13 wherein said valve seat comprises a ridge surrounding said opening for engaging said resilient seal gasket.

18. A vacuum gate valve as defined in claim 13 wherein said opening comprises an elongated slit.

* * * * *